US00RE35232E

United States Patent [19]

Stephens

[11] E Patent Number: Re. 35,232

[45] Reissued Date of Patent: May 7, 1996

[54] BOWLING ALLEY BUMPER SYSTEM

[75] Inventor: Michael W. Stephens, Richmond, Va.

[73] Assignee: AMF Bowling, Inc., Mechanicsville, Va.

[21] Appl. No.: 111,595

[22] Filed: Aug. 25, 1993

Related U.S. Patent Documents

Reissue of:

[64] Patent No.: 5,181,716
Issued: Jan. 26, 1993
Appl. No.: 845,035
Filed: Mar. 3, 1992

[51] Int. Cl.[6] ..... A63D 5/00

[52] U.S. Cl. ..... 473/55; 473/113

[58] Field of Search ..... 473/55, 106, 109, 473/113, 116

[56] References Cited

U.S. PATENT DOCUMENTS 3,401,933 9/1968 Conklin et al. ..... 473/113
4,900,024 2/1990 Chandler et al. ..... 473/113
5,207,422 5/1993 Beene ..... 473/113

*Primary Examiner*—Vincent Millin
*Assistant Examiner*—William M. Pierce
*Attorney, Agent, or Firm*—Bacon & Thomas

[57] ABSTRACT

A bowling alley bumper system which can be used for conventional bowling and for bumper bowling is disclosed. The bowling alley bumper system includes a pair of gutters having longitudinally extending portions and extending and retracting means for moving those portions into an extended position which allows bowling balls to fall into and roll along one of the gutters. In one embodiment, the portion is moved upwardly or downwardly along an arc in an xz plane with little or no lateral movement.

6 Claims, 5 Drawing Sheets

BOWLING ALLEY BUMPER SYSTEM

Matter enclosed in heavy brackets [ ] appears in the original patent but forms no part of this reissue specification; matter printed in italics indicates the additions made by reissue.

FIELD OF THE INVENTION

This Invention relates to a bowling alley bumper system and, more particularly, to a bowling alley bumper system wherein the gutter or portion thereof is elevated to prevent a bowling ball from falling into the gutter.

BACKGROUND OF THE INVENTION

Bowling alley bumper systems have been available since at least as early as 1965. Such systems were designed to be used by children and/or the physically handicapped as well as others who lack the physical coordination or strength to bowl, i.e., project a majority of the balls over the length of the alley without ending up in one of the gutters. Early systems require relatively difficult steps to set up a lane or lanes for so-called "bumper" bowling. For this reason, a number of bowling alley operating personnel were reluctant to promote "bumper" bowling or to encourage children or the handicapped to use the lanes.

One approach to overcome the aforementioned problem is disclosed in U.S. Pat. No. 3,401,933 to Conklin et al. That patent discloses a convertible bowling lane having a gutter with a ball receiving surface on one side and a ball deflecting surface on the opposite side and means for moving the gutter between a ball receiving position and a ball deflecting position. As disclosed therein, the gutter is pivotally mounted on a support member which is disposed on the opposite side of the gutter from the bowling lane. The system does present the appearance of a normal bowling alley when in its recessed position, but is relatively complex and somewhat expensive to install.

More recently, a bowling alley bumper mechanism such as the one disclosed in U.S. Pat. No. 4,900,024, overcame many of the earlier problems. In such systems, an elongated bumper is mounted alongside and parallel to each alley gutter. The system also include movable supports that permit the extension of the bumpers to guard the gutters when guarding is desired and retraction of the bumpers to expose the gutters when normal alley operation is desired. The Chandler et al. system is less costly and less complex than the Conkiln et al. system, but extends upwardly above the level of the alley even in its recessed position, It also presents an obstacle to walking along the normal capping and may lead to individuals walking on the alley.

An improvement to the Chandler et al. system is disclosed in the copending application of C. Dennis Lord. Ser. No. 07/758,003, filed on Sep. 12, 1991,and assigned to the same assignee as the present application. As shown therein, the Chandler et al. system may be constructed to present a more pleasing appearance, but still results in an elevated portion adjacent to the alley which may be objectionable to some bowlers and/or alley owners.

It is now believed that the availability of the Chandler et al. type systems, coupled with a change in demographics and business pressures, will encourage bowling alley operators to put more emphasis on bumper bowling to encourage children to learn to bowl, attract families and provide a challenging game for the physically handicapped. For this reason, it is presently believed that there is a demand for an improved bowling alley bumper system which provides a more normal appearance when not in use, is relatively inexpensive to manufacture, easy to install and remove, protects the mechanism from damage and, at the same time, provides ready access to the rear of the lanes without walking on the lanes.

It has now been found that an improved bowling alley bumper system in accordance with the present invention provides the aforementioned desirable features.

BRIEF SUMMARY OF THE INVENTION

In essence, the present invention contemplates an improved bowling alley bumper system wherein the bowling alley can be used for conventional bowling and for bumper or carum bowling. The bowling alley has two sides and a longitudinally extending lane on an upper surface thereof. The alley also includes a foul line at one end thereof and a pin deck at its opposite end. A pair of elongated, concave gutters extend along each side of and in substantially abutting relationship to the alley between the ends thereof for receiving a bowling ball which is directed toward the edge of the alley. i.e.. which falls off of the lane. The bumper system utilizes the gutters or a portion thereof to prevent a bowling ball from falling into gutter. For example, in one embodiment of the invention, each of the gutters define first and second separate longitudinally extending portions with each of the portions having a major axis which is parallel with the major axis of the gutters. Extending and retracting means are provided for moving the gutters or one of the portions in each of the gutters upwardly into an extended position to thereby prevent a bowling ball from falling into one of the gutters and downwardly into a retracted position which allows bowling balls to fall into and roll along one of the gutters.

In a preferred embodiment, a first portion of each of the gutters, i.e., the portion adjacent to the alley, is moved upwardly or downwardly along an are in an xz plane with little or no lateral movement, i.e.. little or no movement along its y axis.

BRIEF DESCRIPTION OF THE DRAWINGS

FIG, 1 is a perspective view of a bowling alley bumper system in accordance with a first embodiment of the invention wherein the bumper system is shown in a recessed position.

DESCRIPTION OF THE PREFERRED EMBODIMENT

Figure 1:
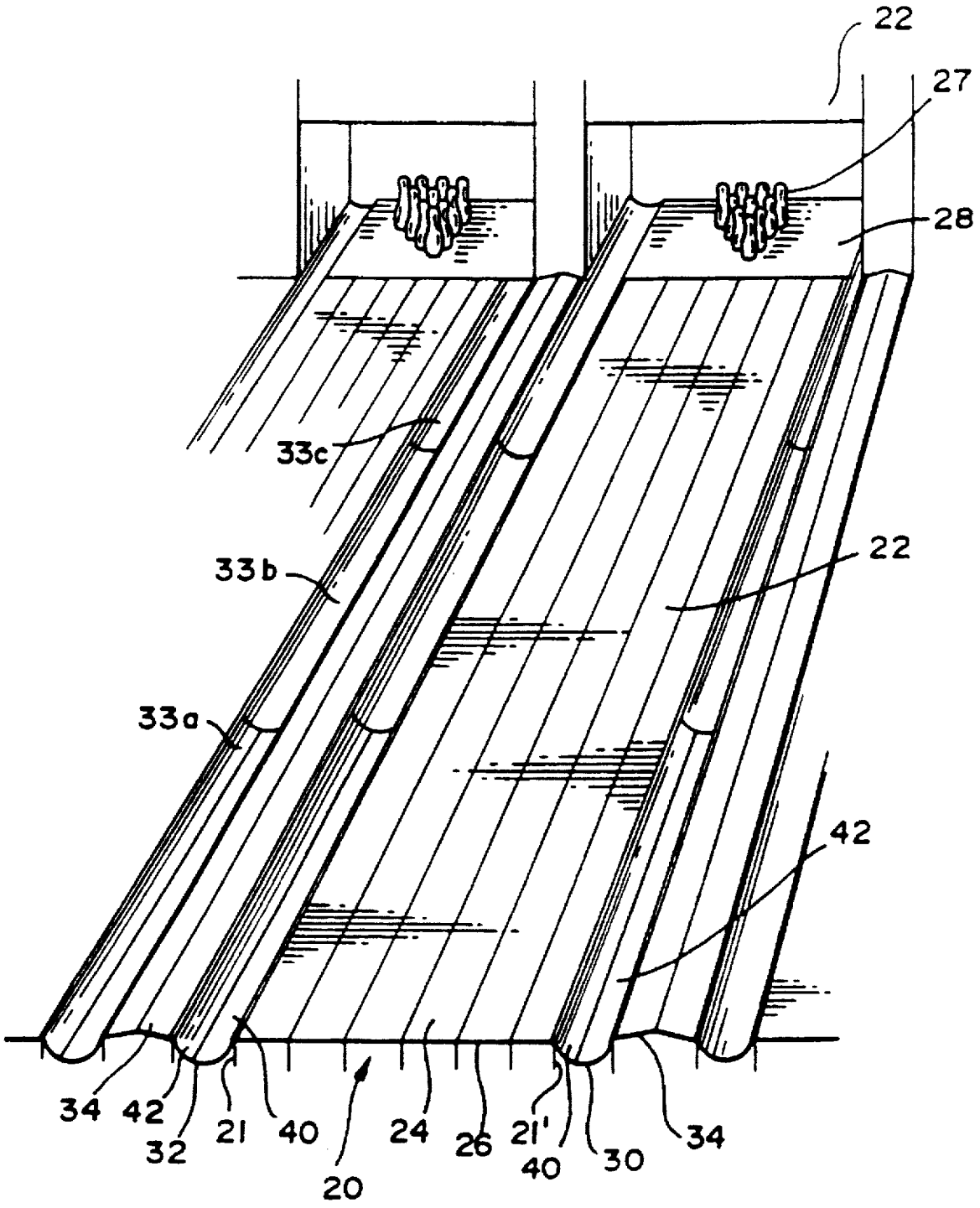

The invention will now be described in connection with the accompanying drawings wherein like reference numerals have been used to designate like parts.

Figure 4:
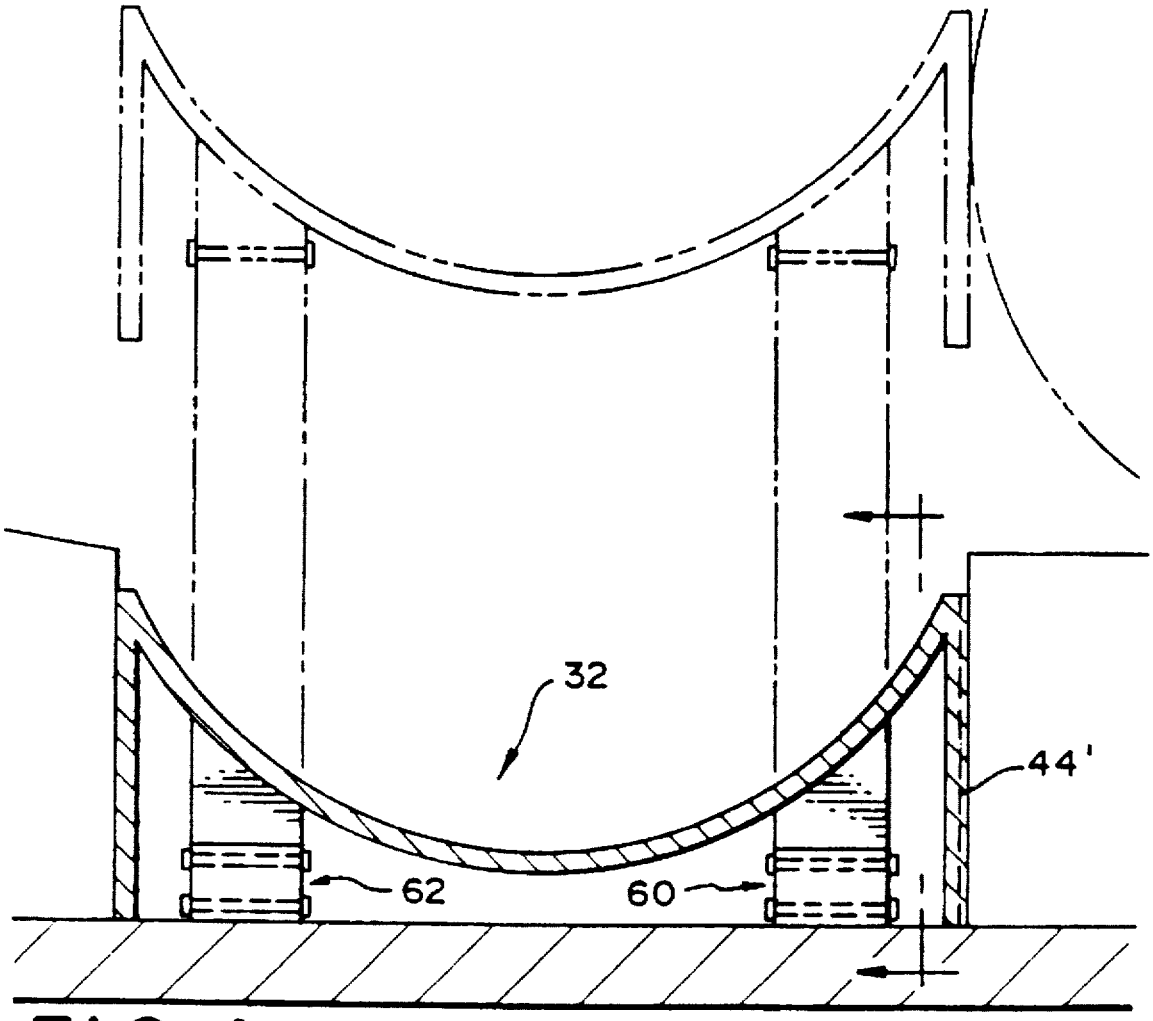
FIG. 4 is an end view of a bowling alley bumper system in accordance with a second embodiment of the invention.

As illustrated in FIG. 1, a bowling alley 10 typically includes a longitudinally extending lane 20 which defines a flat horizontal plane on a upper surface thereof and which is typically made up of a plurality of parallel abutting strips of wood 22, 24. The alley includes a foul line 26 which extends across the lane 20 and perpendicular to the longitudinal axis of the lane. The foul line 26 indicates that area beyond which a bowler may not pass in releasing a bowling ball during a game of bowling. A pin deck 28 is disposed at the opposite end of the lane 20 and is adapted to receive a plurality of bowling pins 27 thereon. As shown in FIG. 4, the bowling alley is set with the pins in a customary triangular pattern with one pin, the head pin in front, a second row of two pins, a third row with three pins and a final of our pins.

A pair of longitudinally-extending gutters 30, 32 are disposed along the side of the lane 20 with one gutter on each side of lane 20 in a customary manner, i. e., adjacent to and in substantially abutting relationship with the lane. The gutters 30, 32 are adapted to receive any balls that are bowled toward one side of the lane and to direct any misdirected balls to the end of the alley. Also illustrated are capping members 34 which separate the adjacent alleys or lanes.

Figure 2:
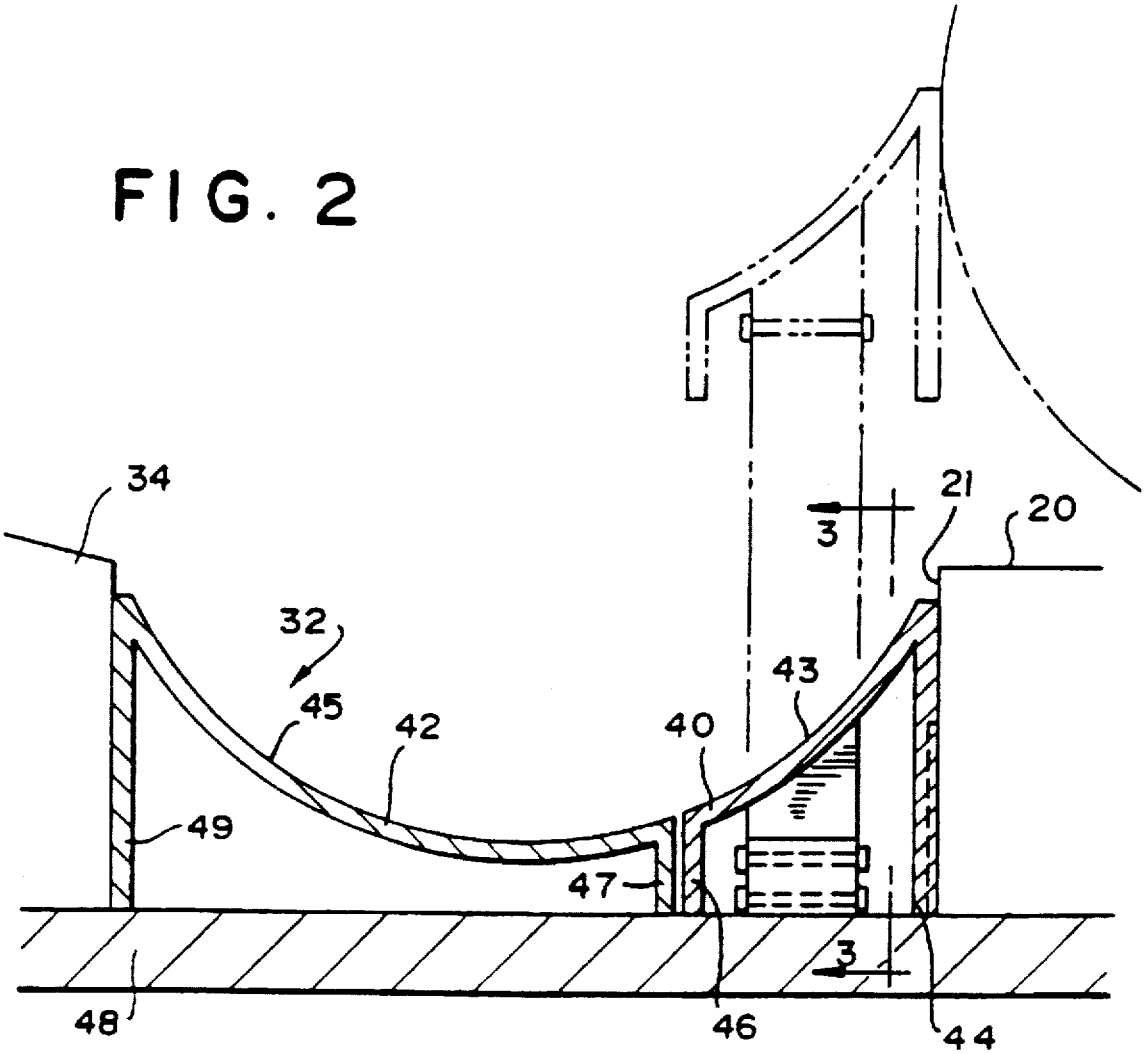
FIG. 2 is an end view of a portion of the bowling alley bumper system shown in FIG. 1, but with the bumper system shown in its extended position by broken lines.
Figure 3:
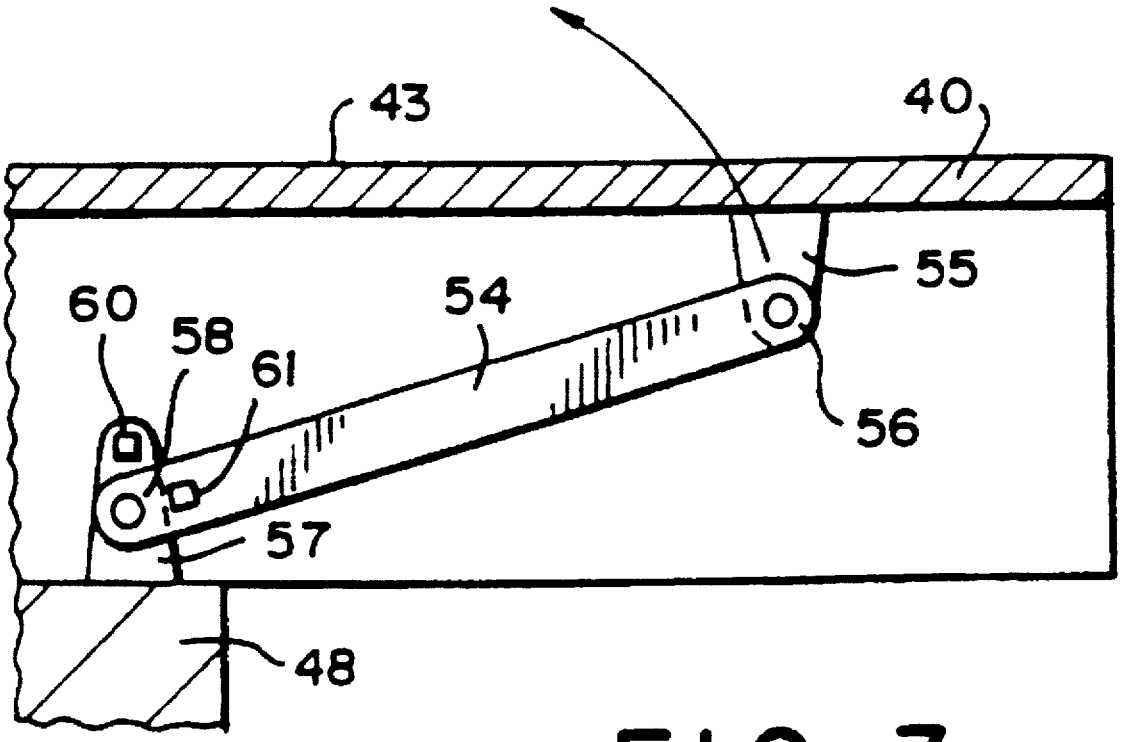
FIG. 3 is a cross-sectional view taken along a—a in FIG. 2.

The mechanism for bumper bowling is illustrated more clearly in FIGS. 2 and 3. As illustrated therein, a bumper bowling system is incorporated in the bowling alley 10 which includes two sides 21, 21' and a longitudinally extending lane 20 on an upper surface thereof. In a preferred embodiment of the invention, each of the gutters 30, 32 define first and second concave, longitudinally extending portions 40, 42. The first portion 40 defines an arc-shaped concave surface 43 which forms a part of the gutter 32 and, in the preferred embodiment, forms about one-third of the gutter when viewed in cross section. The portion 40 also includes a pair of downwardly extending projections 44, 46 which are preferably parallel to one another. The projections 44, 46 support the portion 40 on a suitable base such as a plurality of cross members 48. The first projection 44 is adjacent to and abuts side 21 and is constructed and arranged to slide upwardly therealong as will be described hereinafter. The projection 44 may also include a resilient bumper 44' recessed thereon for engaging a bowling ball which is directed toward the bumper.

The second longitudinally extending portion 42 also defines an arc-shaped concave surface 45 which, in the preferred embodiment, forms the outer two-thirds of gullet 32. The portion 45 also includes a pair of downwardly extending parallel projections 47, 49. The projections 47, 49 are fixed to the cross member 48 in a customary manner with a first of the projections 47 adjacent to and perhaps abutting projection 36. The second projection 49 is adjacent to and abutting capping member 34 which separates a pair of alleys.

Figure 5:
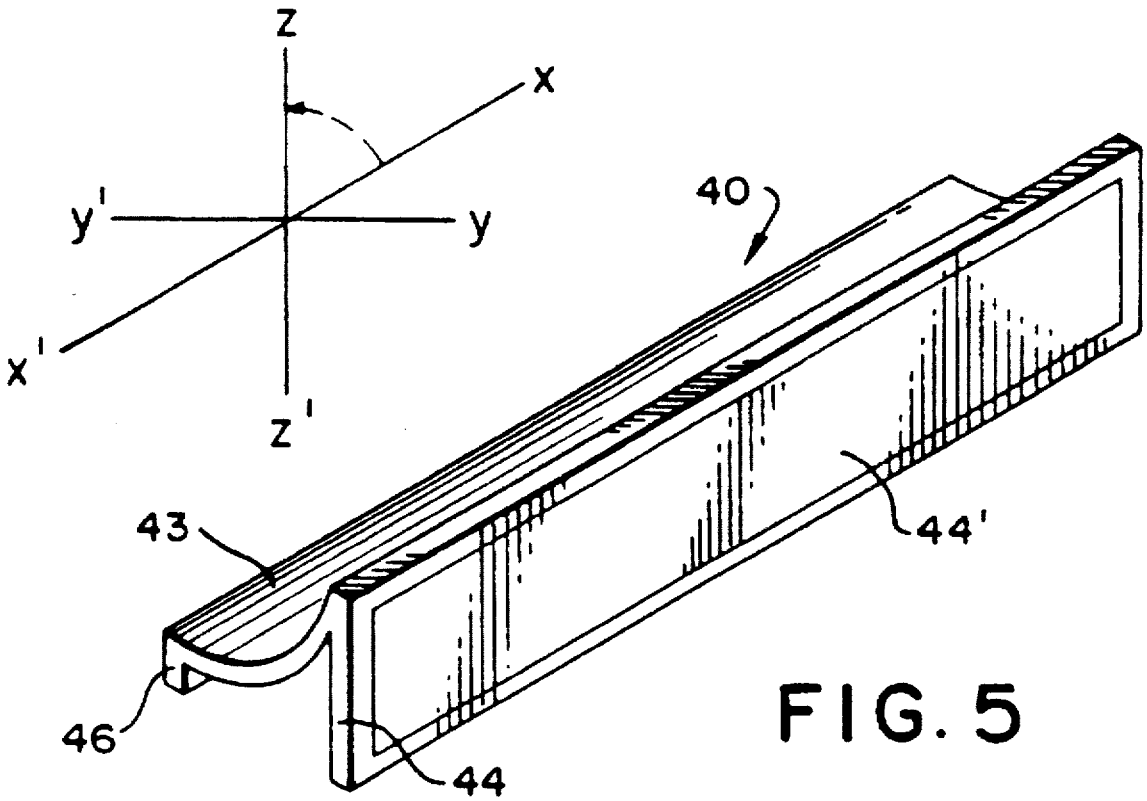
FIG. 5 is a perspective view of a portion of a bowling alley gutter system and illustrating its arc-shaped movement within the xz plane.

For conventional bowling, the longitudinally extending portions 40 are positioned in the lower or retracted position shown in FIGS. 1 and 2. However, where it is desired to convert the Jane to bumper bowling as defined more clearly in the aforementioned patents of Conklin et al. and Chandler et al,, each of which is incorporated herein in its entirety by reference, the portion 40 is raised upwardly along an arc as illustrated in FIGS. 3 and 5. The portion 40 is moved upwardly by means of a crank arm 54 and a pair of swivel connecting elements 56 and 58 to the position shown by the broken lines in FIG. 2. The swivel connecting elements 56 and 58 are operatively connected to the bottom of portion 40 in a conventional manner such as a bracket 55 and to the cross member 48 by means of a bracket 57. Locking means, such as projection 60 and detect 61 or other suitable mechanism, ay also be provided for maintaining the bumper in an elevated position.

In a preferred embodiment of the invention, the portion 40 is moved upwardly along a path that corresponds to the arc shown m FIGS. 3 and 5. This motion is in the az plane so that there is little or no lateral motion, i.e., along the y axis as shown schematically in FIG. 5.

In the preferred embodiment of the invention, the gutters 30, 32 may be divided into three segments or more. 32 abc and 34 abc along the length of the alley for ease of manufacture, shipping and installation. However, in such cases, the mechanism for raising and lowering a portion of the gutter will be interconnected in a conventional manner so that a bumper may be raised along the length of the alley from one end of the alley.

A second embodiment of the invention is shown in FIG. 1V wherein an entire gutter 32 including a pair of downwardly projecting elements 70, 72 is lifted upwardly along an arc in an xz plane by means of a pair of crank arm assemblies 60, 62. A single assembly of the type shown in FIGS. 2 and 3 and as described above could be used. In either case, the assemblies 60, 62 or single assembly would be constructed and arranged and operate in the same manner as described above. As shown in FIG. 1V, the gutter is lifted upwardly without tilting so that the top of the gutter, i.e., both sides thereof, remains in a common horizontal plane.

Also, in moving the portion 40 along an arc in the xz plane, it may be desirable to bevel the forward edge thereof to avoid any binding during the elevating step.

While the invention has been described in connection with one of its preferred embodiments, it should be understood that changes and modifications may be made without departing from the scope of the appended claims.

What is claimed is:

1. A bumper bowling system comprising a series of cross supports and a bowling alley disposed on said series of cross supports, said bowling alley having two sides and a longitudinally extending lane having a major axis on an upper surface of said alley, said lane having a foul line at one end and a pin deck at the other end thereof, a pair of elongated concave gutters extending along and substantially abutting the sides of said lane between the ends thereof for receiving a bowling ball which falls off of said lane, each of said gutters having first and second separate longitudinally extending portions with each of said portions having a major axis parallel to the *major* axis of said lane, each of said portions including [means defining] an arc-shaped segment with a first downwardly extending projection which extends downwardly with respect to said alley *from said longitudinally extending portion*, a second downwardly extending [portion] *projection* which is parallel with said first downwardly extending projection, extending and retracting means for moving [each] *a first* of said portions of each of said gutters upwardly with respect to said alley into an extended position to thereby prevent a bowling ball from falling into one of said gutters and downwardly into a retracted position which allows bowling balls to roll into and along said one of said gutters and each of said extending and retracting means including a pair of swivel joints and an arm connecting said swivel joints and wherein a first of said swivel joints is operatively connected to said portion and the second of said swivel joints is operatively connected to one of said cross supports, said longitudinally extending portions lie on an x axis with a y axis laterally thereof and a z or vertical axis and wherein said extending and retracting means moves each of said portions including said downwardly extending projections an equal distance upwardly and downwardly along an are in the xz plane without any substantial lateral movement along the y axis.

2. A bumper bowling system in accordance with claim 1 in which said first downwardly extending portion defines a planer surface which is essentially coplaner with the adjacent side of said alley.

3. A bumper bowling system in accordance with claim 2 which includes means for locking said portions in an upwardly extending position.

4. A bumper bowling system in accordance with claim 2 in which resilient bumper means are disposed in an outer lower portion of said first downwardly projecting portion to thereby engage a bowling ball when the ball is rolled in the direction of the alley.

5. A bumper bowling system comprising a series of cross supports and a bowling alley disposed on said series of cross supports, said bowling alley having two sides and a longitudinally extending lane having a major axis on an upper surface of said alley, said lane having a foul line at one end and a pin deck at the other end thereof, a pair of elongated concave gutters extending along and substantially abutting the sides of said lane between the ends thereof for receiving a bowling ball which falls off of said lane, each of said gutters having first and second separate longitudinally extending portions with each of said portions having a major axis parallel to the axis of said lane, each of said portions including means defining first and second laterally-spaced longitudinally extending arc-shaped segments including a downwardly extending projection which extends downwardly with respect to said alley adjacent to a side of said alley and a second downwardly extending projection which extends downwardly with respect to said alley and which is parallel with said first downwardly extending projection, extending and retracting means for moving said first arc-shaped segment of each of said portion of each of said gutters upwardly with respect to said alley into an extended position to thereby prevent a bowling ball from falling into one of said gutters and downwardly into a retracted position which allows bowling balls to roll into and along said one of said gutters, said extending and retracting means including a pair of swivel joints and an arm connecting said swivel joints and wherein a first of said swivel joints is operatively connected to said first arc-shaped segments and the second of said swivel joints is operatively connected to one of said cross supports and each of said first arc-shaped segments lies on an x axis with a y axis laterally thereof and a z or vertical axis and wherein said extending and retracting means moves each of said first arc-shaped segments upwardly and downwardly along an arc in the xz plane without any substantial lateral movement along the y axis.

*6. A bumper bowling system comprising a series of cross supports and a bowling alley disposed on said series of cross supports, said bowling alley having two sides and a longitudinally extending lane having a major axis on an upper surface of said alley, said lane having a foul line at one end and a pin deck at the other end thereof, a pair of elongated concave gutters extending along and substantially abutting the sides of said lane between the ends thereof for receiving a bowling ball which falls off of said lane, each of said gutters having first and second separate longitudinally extending portions with each of said portions having a major axis parallel to the major axis of said lane, each of said portions including a segment with a first downwardly extending projection which extends downwardly with respect to said alley from said longitudinally extending portion, a second downwardly extending projection which is parallel with said first downwardly extending projection, extending and retracting means for moving a first of said portions of each of said gutters upwardly with respect to said alley into an extended position to thereby prevent a bowling ball from falling into one of said gutters and downwardly into a retracted position which allows bowling balls to roll into and along said one of said gutters and each of said extending and retracting means including a pair of swivel joints and an arm connecting said swivel joints and wherein a first of said swivel joints is operatively connected to said portion and the second of said swivel joints is operatively connected to one of said cross supports, said longitudinally extending portions lie on an x axis parallel with the major axis with a y axis laterally thereof and a z or vertical axis and characterized by said extending and retracting means moves each of said portions including said downwardly extending projections an equal distance upwardly and downwardly along an arc in the xz plane without any substantial lateral movement along the y axis.*

* * * * *